United States Patent Office 2,912,089
Patented Nov. 10, 1959

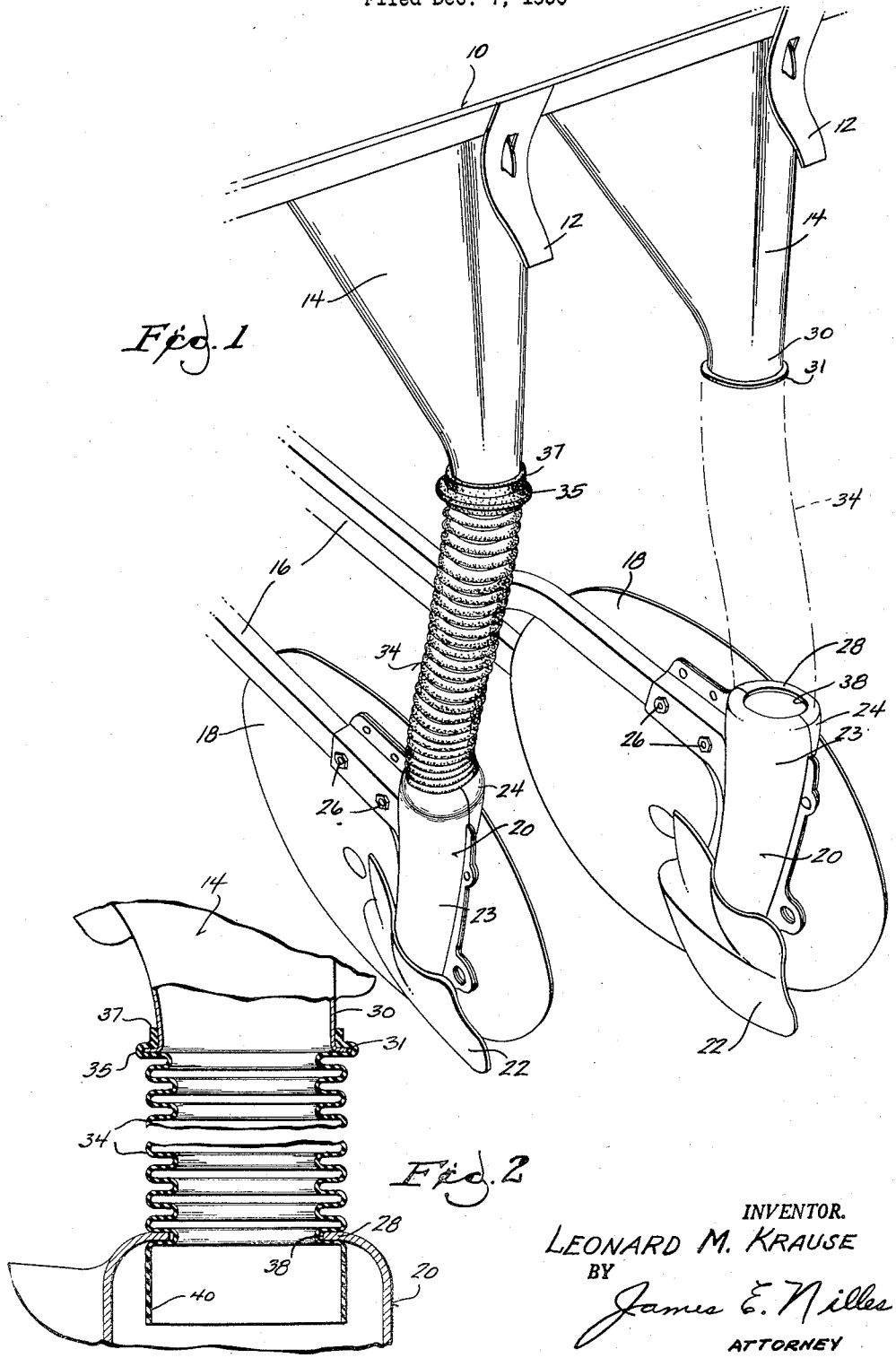

2,912,089

GRAIN DRILL

Leonard M. Krause, Toronto, Ontario, Canada, assignor to Massey-Ferguson Inc., a corporation of Maryland Application December 7, 1956, Serial No. 626,961

2 Claims. (Cl. 193—9)

This invention relates to agricultural machines such as planters or grain drills and is more particularly concerned with the mechanism for conveying the grain, seed and/or fertilizer from their respective hoppers down into the furrow. This mechanism is commonly referred to as the funnel, conductor and boot.

This subject matter of this invention is in the nature of an improvement over the material conveying means shown in U.S. Patent Number 2,763,355, issued September 18, 1956. In that patent a conventional spirally wound spring steel tube is used which is telescopingly collapsible to a certain extent.

However the type of material used in devices of this type, such as fertilizer, is very corrosive and tends to readily cake and harden when exposed to moisture. This action causes the joints of the metal conductor tube to become rigid, that is, incapable to free flexing movement. This is highly undesirable as the height to which the seed boot can be raised for transport purposes is limited to the amount of compressibility of this tube. The means for fastening the tube of prior art devices to either its funnel or seed boot usually consisted of a knob or projection on the boot over which is inserted an aperture in the funnel or boot. Other devices use a clamp of one form or another. After a certain period of use however, this aperture and projection or the clamp becomes caked and "rusted" and renders the connection very difficult to make or break. A tool such as a pliers is often required for those connecting devices.

It is therefore an object of this invention to provide a simple and yet effective means for fastening a flexible conductor tube to the grain receiving funnel and seed boot which can be easily made without the use of any tools and which will not corrode so as to become inoperative.

It is a general object of this invention to provide an improved material conveying mechanism for guiding the material from its hopper to the furrow.

Referring more particularly to the drawings, Fig. 1 is a perspective view taken generally from the rear side of a grain drill and showing the improved conveying means as attached thereto.

Figure 2 is a fragmentary elevational view in section, with certain parts broken away, showing the conductor connection to the funnel and to the seed boot, of the device shown in Figure 1, but on an enlarged scale.

Referring more particularly to the drawings, the material hopper 10 has spring clips 12 secured along its length which detachably connect the material receiving funnel 14 thereto. A drag bar 16 is pivotally connected at its front end (not shown) to the planter frame which permits the drag bar to move vertically relative thereto in the well known manner. A disc opener 18 is rotatably carried at the rear end of each drag bar for the purpose of slicing through the ground to make a furrow. Also secured to the rear end of the drag bar is a seed boot 20 to the lower end of which is secured a shield 22. The seed boot extends downwardly between the disc and the shield so as to deposit the seed and fertilizer in the furrow formed by the disc and shield. The seed boot is formed from complementary halves 23, 24 which are stamped from sheet metal. These halves are then spot welded together along their abutting flanges to form an integral unit and are secured by bolts 26 to the drag bar.

In accordance with this invention the upper end of the seed boot is turned inwardly to form an annular flange 28 which defines an aperture 38.

The lower discharge end 30 of the funnel is generally circular in cross section and has an outwardly extending annular flange 31 around the periphery thereof. This funnel is also formed from sheet metal and this flange serves to reinforce and rigidify its lower end.

The conductor tube 34 is made from a corrugated, flexible, oil resistant tubing. Material such as neoprene has been found very satisfactory for this tubing because it will remain soft and pliable. The tube has a major diameter defined by its external diameter in the unstretched condition and a minor diameter defined by its internal diameter in the unstretched or "normal" condition.

The tubing is connected to the lower end of the funnel by inserting at least one corrugation 35 over the flange 31. As will be seen in Fig. 2, the diameter of the flange is greater than the unstretched major diameter of the tubing. Therefore when the tubing is in place on the flange it forms a very tight fit therewith. To remove the tube it is only necessary to grasp the upper edge 37 and "peel" it from the funnel. This can be done easily and quickly without any tools, it being simply necessary to grasp the edge 37 and pull outwardly and downwardly away from the funnel.

The diameter of the aperture 38 which is formed by the flange 28 in the top of the seed boot is considerably smaller than the major diameter of the tubing. In fact the diameter of aperture 38 is substantially the same as the minor or inner diameter of the tube. As will be seen in Fig. 2, the flange 28 is fitted between the corrugations at the lower end of the tube and a lower straight portion 40 of the tube extends into the boot. The connection of the tube to the boot is easily made by simply compressing the lower end of the tube with the fingers and inserting at least one corrugation in the aperture 38. Upon releasing the tube it will spring outwardly to its original shape and snugly grasp the flange 28 in one of its corrugations 39. Thus the top of the boot is sealed against the entry of foreign matter such as dirt. To remove the tube from the boot it is simply necessary to compress the tube adjacent the boot with the fingers and withdraw it from the aperture.

In practice it has been found that the tube will remain firmly attached to both the funnel and the boot but can be easily disconnected therefrom as above mentioned. The continual flexing of the tube insures that material does not lodge in any of its corrugations and that the tube is self-cleaning in that respect. This corrugated "rubber" tube can be compressed to a much greater extent than can the spiral spring steel type of conductor and therefore considerably more transport height can be had for the opener-seed boot of this arrangement.

I claim:

1. A seed conveying mechanism for a planter including, a funnel having a generally circular in cross section lower discharge end and an outwardly extending annular flange extending therefrom, a flexible tube having a section of uniform diameter at one end and corrugated throughout the remainder of its length, the corrugated portion of said tube being dimensioned to be stretched over said lower end for snugly embracing said flange in one of its corrugations, a seed boot having an inwardly extending annular flange at its upper end defining an aperture, said tube adapted to be compressed and inserted in said aperture where it snugly grasps said boot flange between said uniform section and the adjacent corrugation with the section projecting into the boot.

2. A seed conveying mechanism for a planter including, a funnel having a generally circular in cross section lower discharge end and an outwardly extending annular flange extending therefrom, a flexible tube having a section of uniform diameter at one end and corrugated throughout the remainder of its length, the corrugated portion of the tube having an unstretched major diameter smaller than the diameter of said flange and adapted to be stretched over said lower end for snugly embracing said flange in one of its corrugations, a seed boot having an inwardly extending annular flange at its upper end defining an aperture, said aperture being of smaller diameter than the major diameter of said tube, said tube adapted to be compressed and inserted in said aperture where it snugly grasps said boot flang between said section and the adjacent corrugation with the section projecting into the boot.

References Cited in the file of this patent

UNITED STATES PATENTS

| | | |
|---|---|---|
| 243,192 | Baylor | June 21, 1881 |
| 1,191,486 | Tyler | July 18, 1916 |
| 2,014,355 | Hussman | Sept. 10, 1935 |
| 2,047,713 | Simpson | July 14, 1936 |
| 2,196,676 | Johnson et al. | Apr. 9, 1940 |
| 2,418,653 | McCormack | Apr. 8, 1947 |
| 2,743,801 | Faust et al. | May 1, 1956 |

FOREIGN PATENTS

| | | |
|---|---|---|
| 504,863 | Great Britain | May 2, 1939 |